(12) United States Patent
Laurent

(10) Patent No.: US 8,587,277 B2
(45) Date of Patent: Nov. 19, 2013

(54) DC TO DC VOLTAGE CONVERTER COMPRISING A CHARGE PUMP CAPACITOR

(75) Inventor: Jean-Marie Laurent, Change (FR)

(73) Assignee: Valeo Systemes de Controle Moteur, Cergy Saint Christophe (FR)

(*) Notice: Subject to any disclaimer, the term of this patent is extended or adjusted under 35 U.S.C. 154(b) by 0 days.

(21) Appl. No.: 13/141,111

(22) PCT Filed: Dec. 15, 2009

(86) PCT No.: PCT/EP2009/067223
§ 371 (c)(1),
(2), (4) Date: Nov. 29, 2011

(87) PCT Pub. No.: WO2010/072626
PCT Pub. Date: Jul. 1, 2010

(65) Prior Publication Data
US 2012/0068682 A1    Mar. 22, 2012

(30) Foreign Application Priority Data
Dec. 22, 2008 (FR) .................. 08 07267

(51) Int. Cl.
G05F 1/00 (2006.01)
(52) U.S. Cl.
USPC ............................... 323/282

(58) Field of Classification Search
USPC ................................. 323/282–285
See application file for complete search history.

(56) References Cited

U.S. PATENT DOCUMENTS

2005/0168206 A1*  8/2005  Nadd ............. 323/285
2007/0108952 A1*  5/2007  Bartolo et al. ......... 323/282
2007/0182395 A1*  8/2007  Sakai et al. ........... 323/283

FOREIGN PATENT DOCUMENTS

DE  199 46 025 A1  3/2001
EP    1 919 082 A1  5/2008

OTHER PUBLICATIONS

International Search Report w/translation from PCT/EP2009/067223 dated Apr. 6, 2010 (6 pages).

* cited by examiner

Primary Examiner — Jue Zhang
(74) Attorney, Agent, or Firm — Osha Liang LLP

(57) ABSTRACT

The invention relates to a DC to DC voltage converter including a charge pump capacitor (C) installed parallel to a means (10, 20) for controlling switches (T1, T2), arranged to maintain a predefined voltage range on the terminals of the means (10) for controlling the upper switch (T1). The control means (10, 20) are arranged so as to close the lower switch (T2) in order to impose zero electric potential on the central terminal of the star (O) when the upper switch (T1) is open, in order to force the charging of the charge pump capacitor (C).

3 Claims, 2 Drawing Sheets

DC TO DC VOLTAGE CONVERTER COMPRISING A CHARGE PUMP CAPACITOR

The invention relates to the field of energy conversion and more especially DC to DC voltage converters, well known to a person skilled in the art as "DC-DC converters". The invention is aimed more specifically at optimizing DC-DC converters on-board an automotive vehicle for obtaining stable voltages at the output of the converters by limiting conversion losses.

DC-DC converters can be used in various electronic equipment of an automotive vehicle. Their function is to convert an input voltage (24 V for example) into a lower output voltage (12 V for example), in order to supply equipment in the automotive vehicle. Energy-saving systems, known as "stop and start" systems, limiting energy consumption when driving in the city by automatically stopping the engine when the vehicle is stopped, require large amounts of electrical power. The voltage of the normal on-board vehicle network 12 V-14 V is not suited to this type of system when the internal combustion engine is a large cylinder one (>1.6 L). This type of system requires higher voltages (24 V for example). In this case, the converter is used to transform the voltage used by the "stop and start" system (24 V) into 12 V voltage and thus for supplying the automotive vehicle equipment.

A DC-DC converter, also known as a "chopper", is a power electronics device using one or more switches, controlled by controllers, in order to cut down the main voltage into a lower output voltage. The cutting down, or chopping, is done at a very high frequency for limiting the size of the converter as well as the internal filtering elements of the converter. The voltage thus produced is DC.

Conventionally, a DC-DC converter takes the form of a voltage conversion circuit including an input terminal, to which the input voltage is applied, an output terminal, from which the output voltage is sampled, and a ground, the circuit forming a three-branched star with a center.

Referring to FIG. 1, the input branch of the circuit, connecting the center of the star with the input terminal, includes a switch, called the upper switch T1. The ground branch of the circuit, connecting the center of the star with the ground, comprises a diode, called the lower diode D2. The output branch, connecting the center of the star with the output terminal, includes an inductance L in which an output current IL circulates. The function of the diode D2 is to allow the current to pass through or to block it according to the state of the switch T1.

The upper switch T1, known to a person skilled in the art as the "High Side" switch, generally takes the form of a transistor (MOSFET/bipolar transistor) which is controlled individually by a controller, connected to its terminals, not shown in FIG. 1. For the controller controlling the upper switch T1 to fulfill its control function, it must be connected to a low value constant potential (12 V for example). This low value constant potential fulfills a function of supplying this controller ("driver").

The upper switch T1 is connected, on the one hand, to the input terminal (voltage with the value that is to be chopped), and on the other hand, to the center of the star whose electric potential is variable. Due to the variations of the electric potential at the center of the star, which happens to be the reference potential of the power supply of the controller of the upper switch T1, this supply is not sufficiently stable.

In order to supply the controller of the upper switch T1, the use is known of a "charge pump" capacitor, better known as a "Boot Strap Capacitor", in the DC-DC converter circuit. This use enables problems of variation of the potential at the center of the star to be overcome.

For this purpose, referring to FIG. 2, a "Boot Strap Capacitor" converter includes, in addition to the input terminal, the output terminal and the ground, a control terminal connected to the center of the star via a control branch. A module 1 for controlling the upper switch T1 is installed in parallel with the charge pump capacitor C in the converter control branch, as shown in FIG. 2.

When the upper switch T1 is closed, the potential of the center of the star (Va) is equal to the potential of the input terminal (Ue). The charge pump capacitor C supplies the module 1 (the capacitor discharges). The control module can then fulfill its function of controlling the upper switch T1.

When the upper switch T1 is open, since the output current IL cannot be canceled instantaneously in the inductance L, the diode D2 becomes forward biased. The potential at the center of the star (Va) is grounded. The current in the capacitor decreases.

The reference potential of the module 1 which is also the potential at the center of the star is connected to the ground.

In this case, the module 1 is supplied by the voltage Ud via the diode Dc (which is forward biased) and the resistance R. At the same time, the capacitor C recharges. The purpose of the resistance R is to limit the recharging current of the capacitor C.

If the current IL is negative, the diode D1 is forward biased and the potential Va=Ue. The charge pump capacitor C discharges for supplying the control module.

Finally, if the output current IL is zero, the potential Va is not referenced to any voltage (floating potential), charge pump capacitor C discharges for supplying the control module.

Given that the charging of the capacitor C depends on the value of the output current IL, the charging time of the capacitor C may be too short, preventing a complete recharging of the capacitor C. This interferes with the input voltage chopping control when the capacitor C has to supply the DC-DC converter control module 1. After numerous charging/discharging cycles, the charge pump capacitor C may not be sufficiently charged for supplying the control module.

One solution would be to guarantee a minimum current in the inductance L for guaranteeing a conduction time of the diode D2 when the switch T1 is opened. However, an unnecessary current in the inductance would lead to an overvoltage on the secondary network (output S).

Another solution would consist in increasing the switching frequency between the opening and closing of the upper switch T1. However, the energy losses associated with switching are then too great.

One of the aims of the invention is to guarantee the charging time of the charge pump capacitor in order to optimize voltage chopping.

The invention relates to a DC to DC voltage converter including an input terminal, an output terminal, a control terminal and a ground, forming a four-branched star circuit with a central terminal, an input voltage being intended to be applied between the input terminal and the ground, the converter including:
- an upper switch, installed in the branch of the star connecting the input terminal with the central terminal of the star, arranged to be controlled in opening and closing for chopping the input voltage;
- a lower switch, installed in the branch of the star connecting the central terminal of the star to the ground, arranged to be controlled in opening and closing;

means for controlling the upper and lower switches;
a charge pump capacitor, installed in parallel with the control means, arranged to maintain a predefined voltage range on the terminals of the means for controlling the upper switch;
a converter characterized by the fact that
the control means are arranged so as to close the lower switch in order to impose zero electric potential on the central terminal of the star when the upper switch is open, in order to force the charging of the charge pump capacitor.

Thanks to the invention, the charge pump capacitor is sufficiently charged when it has to supply the control module of the upper switch. The control means therefore fulfill a chopping control function and a function of forced charging of the capacitor which guarantees the quality of chopping. These control means may take the form of an individual control module for each switch, or a single module integrating the two controls.

In the automobile field, the charge pump capacitor, is arranged to maintain a voltage range which is generally from 10 to 15 V on the terminals of the means for controlling the upper switch.

The charging of the charge pump capacitor is not dependent on the value of the output current, since the reference potential is maintained, when the upper switch is open, at a perfectly zero value guaranteeing fast and efficient recharging of the capacitor.

The use of a lower switch has been known in the prior art, including a low value internal resistor, for reducing the losses associated with conversion for high intensity currents. However, this lower switch was not controlled for the purpose of forcing the charging of the capacitor.

According to one particular embodiment of the invention, the converter includes an inductance installed in the branch of the star connecting the output terminal to the central terminal of the star, an output current circulating in said inductance. The control module closes the lower switch during a predetermined time for charging the capacitor.

When the upper switch is open, the output current gradually decreases. If the lower switch is also open, the current stabilizes naturally at the zero value, the potential of the central terminal of the star then floating. But if the control module keeps the lower switch closed to impose a zero electric potential at the central terminal of the star, the output current does not stabilize at its zero value as it drops (due to the lower switch still being closed) and may take negative values.

Thanks to this preferred embodiment in which the control module only imposes the closure of the lower switch (and therefore the forced charging of the charge pump capacitor) when the output current is positive, the output current remains positive, forced charging being halted before it reaches the zero value. The output current then stabilizes at the zero value and the reference potential remains at a (floating) potential.

Preferably, the control module imposes a zero electric potential on the central terminal of the star immediately after the opening of the upper switch.

Preferably, the control module is arranged to close the lower switch when the upper switch is open during a recovery period at least equal to:

$T\text{min} = 3 \times RC$ (in µs)  (Simplified equation)

example for R=2.4Ω and C=470 nF

→$T\text{min} = 3 \times 2.4\Omega \times 470\text{ nF} = 3.4$ µs

The invention further relates to a method of controlling the converter defined above, in which the control module is programmed to close the lower switch in order to impose a zero electric potential on the central terminal of the star when the upper switch is open, in order to force the charging of the charge pump capacitor.

The invention also relates to a method of programming a control module for the converter defined above, in which the module is programmed so that it closes the lower switch in order to impose a zero electric potential on the central terminal of the star when the upper switch is open, in order to force the charging of the charge pump capacitor.

The invention will be better understood with the aid of the attached drawing in which.

Figure 1:
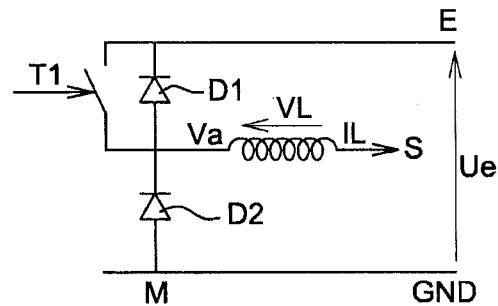
FIG. 1 is a schematic representation of a half-bridge converter according to the prior art.
Figure 2:
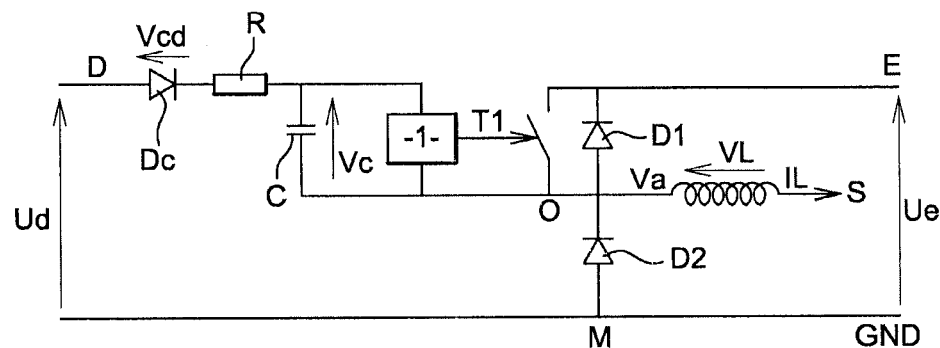
FIG. 2 is a schematic representation of a converter according to the prior art with a charge pump capacitor and a control circuit.
Figure 3:
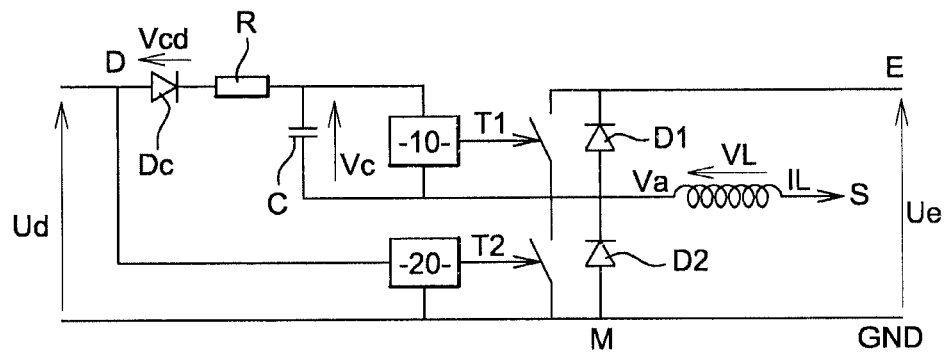
FIG. 3 is a schematic representation of the converter circuit of the invention with a lower switch controlled by the control module.
Figure 4:
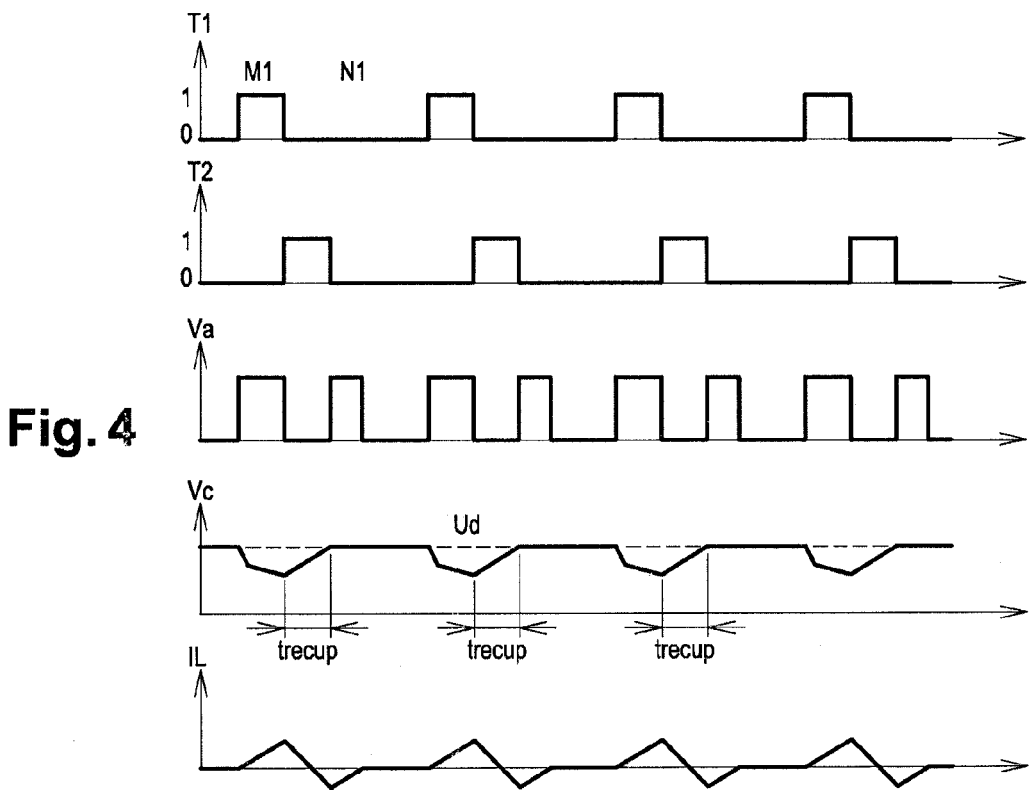
Figure 5:
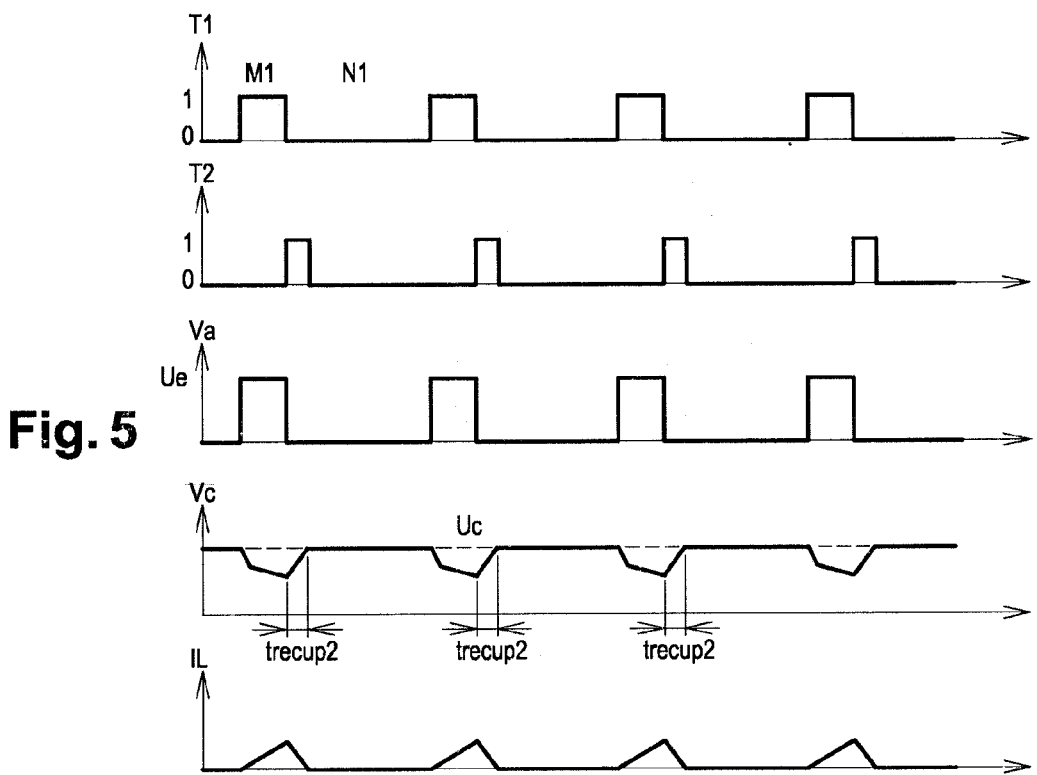

FIG. 4 shows a timing diagram in which the value of the electric potentials of different points of the circuit in FIG. 3 and the value of the output current are shown according to the different positions of the switches, the control module ordering the opening of the lower switch when the output current in the inductance is negative; and FIG. 5 shows a timing diagram in which the control module orders the opening of the lower switch when the output current in the inductance is positive.

The invention relates to a DC to DC, or DC-DC, voltage converter such as those on-board an automotive vehicle. A converter is a device comprising a conversion circuit for converting one voltage into another voltage or current intensity.

Referring to FIG. 3, a converter's circuit includes an input terminal E, an output terminal S, a control terminal D and a ground M forming a four-branched star circuit with a central terminal O.

The converter's conversion circuit includes an upper switch T1, known to a person skilled in the art as a "High Side" switch, installed in the branch of the star connecting the input terminal E with the central terminal of the star O, the upper switch T1 being arranged to be controlled in opening and closing, i.e. to be moved between an opening position and a closing position.

The conversion circuit also comprises a lower switch T2, known to a person skilled in the art as a "Low Side" switch, installed in the branch of the star connecting the ground M with the central terminal of the star O, also arranged to be controlled in opening and closing.

An input voltage Ue, in this instance 24 V, is imposed between the input terminal E and the circuit's ground.

It should be noted here that the control of the lower switch T2 does not pose any problems given that this switch T2 is connected to the circuit's ground; this is because it is simple to control a switch connected to a constant low value potential.

The upper T1 and lower T2 switches here take the form of MOSFET or bipolar or IGBT type transistors. They are each coupled to a higher D1 and lower D2 current diode, respectively. The higher D1 and lower D2 diodes are each connected in parallel on said upper T1 and lower T2 switches.

The conversion circuit includes an inductance L, installed in the branch of the star connecting the output terminal S with the central terminal of the star O, an output current IL circulating in said inductance L. The function of the voltage converter is to supply at its output terminal an output current IL intended for a current consumer or a voltage capable of being sampled at the output terminal S. The inductance here takes the form of a coil L but any other current consumer could also be suitable.

The conversion circuit further includes a module 10 for controlling the upper switch T1 installed in the branch of the star connecting the control terminal D with the central terminal of the star O, as well as a module 20 for controlling the lower switch T2. The control modules 10, 20 form the means for controlling the switches T1, T2. Each control module 10, 20 here is a transistor "driver". A programmable logic circuit, better known as an FPGA or "field-programmable gate array", is used to send the logic signal to the module 10.

The control module 10 is supplied by a control voltage Ud applied between the control terminal D of the conversion circuit and its ground M. A control module must use a reference for controlling elements; as described previously, the control module 10 of the conversion circuit uses as a reference the electric potential Va of the central terminal of the star O, which is floating. In order to compensate for the variations in this reference electric potential Va, hereafter referred to as "reference potential Va", the conversion circuit also includes a charge pump capacitor C, connected in parallel with the control module 10 on the control branch of the converter. Referring to FIG. 3, a resistance R and a charging diode Dc are installed in series in the control branch between the control terminal D and the combination in parallel of the control module 10 and the charge pump capacitor C. The charging diode Dc advantageously prevents a current from circulating to the control terminal, the resistance R regulating the value of the current in the control branch.

The control module 10 of the conversion circuit of the invention is arranged in order to force the charging of the charge pump capacitor C when the upper switch T1 is opened, by imposing a zero electric potential on the reference potential Va.

In this example, the control module 10 closes the lower switch T2, after the upper switch T1 opens, for a recovery period t enabling the charge pump capacitor C to be recharged. Thus, advantageously, the reference potential Va is connected to the conversion circuit ground, imposing the forced charging of the charge pump capacitor C.

Referring to the timing diagram in FIG. 4, during the voltage chopping operation, when the upper switch T1 is closed (T1=1) and the lower switch T2 is open (T2=0), the reference potential Va is equal to the potential of the input terminal (E), i.e. equal to the input voltage Ue. The charge pump capacitor C discharges by supplying the control module 10, the value Vc of the voltage at the terminals of the charge pump capacitor C decreasing. While the upper switch T1 is closed (T1=1), the output current IL is increasing. The output voltage Us, at the output terminal (S) of the converter, is increasing.

Hereafter, and for convenience, the period of closure of the upper switch T1 is referred to as the "positive chopping period M1" and the period of opening of the upper switch T1 as the "negative chopping period N1".

At the end of the positive chopping period M1, the control module 10 controls the opening of the upper switch T1 (T1=0); the output current IL then begins to decrease in the inductance L installed in the output branch.

After a short switching period $t_{com}$, not visible in FIG. 4, the control module 10 controls the closure of the lower switch T2 (T2=1). Preferably, the control module 10 is configured in such a way that the switching period $t_{com}$ is the shortest possible. However, the switching period $t_{com}$ is not zero in order to limit the risk of short circuit which would occur if the switches T1 and T2 were closed at the same time.

Following the closure of the lower switch T2, the reference potential Va is connected to the conversion circuit ground for a recovery period $t_{recup}$ during which the charge pump capacitor C recharges. This recovery period $t_{recup}$ is dimensioned so that the charge pump capacitor C can be fully recharged.

The charge pump capacitor C being fully recharged, the upper switch T1 can be controlled extremely precisely, the charge pump capacitor C compensating for the variations in potential Va on the central terminal of the star O. The control of the switch T2 by the control module 10 is thus used to optimize the charging of the charge pump capacitor C, therefore the control of the upper switch T1 and, as a consequence, the quality of the chopping and hence the voltage conversion.

At the end of the recovery period $t_{recup}$, the lower switch T2 is moved into the open position (T2=0) and the upper switch T1 remains in the open position (T1=0); the output current IL then begins to increase then stabilizes at a zero value.

As long as the output current IL is negative in the inductance L and the lower switch T2 is open, the reference electric potential Va is equal to the potential of the input terminal E of the circuit, given that the upper diode D1 is forward biased. When the output current IL becomes zero in the inductance L, the upper diode D1 is blocking and the reference electric potential Va becomes floating.

According to another embodiment of the invention, referring to FIG. 5 the control module 10 controls the closure of the lower switch T2 only when the output current IL is positive in the inductance L; in other words, it controls the reopening of the switch T2 before the output current IL has reached its zero value. Thus the risk of seeing the output current take negative values is limited which, as explained earlier, would have the consequence that the reference electric potential Va would take the value of the potential of the input terminal E, which would be detrimental to the quality of the control of the control module 10, this input potential being relatively high. Referring to FIG. 5, the lower switch T2 is closed during a period of time $t_{recup2}$ during which the output current IL in the inductance L is always positive.

Preferably, the control module 10 controls the closure of the lower switch T2 immediately after the opening of the upper switch T1, which enables the period during which the lower switch T2 can be closed to be optimized and the output current to remain positive.

According to a preferred embodiment of the invention, the closure of the switch T2 is controlled during a recovery period $t_{recup}$ corresponding to the minimum charging time of the charge pump capacitor C. By limiting the duration of closure of the switch T2, the risk of letting the output current take negative values is yet further limited.

As an example, for a charge pump capacitor C of 470 nf, a control voltage Uc of 15 Volts and a resistance R of 2.4 ohms, a recovery time of 3.4 µs is calculated.

$$T\text{min} = 3 \times RC = 3 \times 2.40 \times 470 \text{ nF} = 3.4 \text{ µs} \quad \text{Simplified Equation:}$$

The invention claimed is:
1. A DC to DC voltage converter, comprising:
an input terminal;
an output terminal;
a control terminal;
a ground, wherein the input terminal, the output terminal, the control terminal, and the ground form a four-branched star circuit with a central terminal, and wherein an input voltage is applied between the input terminal and the ground;

an upper switch, installed in a branch of the star connecting the input terminal with the central terminal of the star, arranged to be controlled in opening and closing for chopping the input voltage;

a lower switch, installed in a branch of the star connecting the central terminal of the star to the ground, arranged to be controlled in opening and closing;

a control means for controlling the upper and lower switches;

a charge pump capacitor, installed in parallel with the control means, arranged to maintain a predefined voltage range on the terminals of the control means for controlling the upper switch;

an inductance, installed in a branch of the star connecting the output terminal with the central terminal of the star;

an output current circulating in said inductance, wherein the control means only close the lower switch as long as the output current is positive;

wherein the control means are arranged so as to close the lower switch to impose a zero electric potential on the central terminal of the star when the upper switch is open, to force the charging of the charge pump capacitor, and wherein the control means impose a zero electric potential on the central terminal of the star immediately after the opening of the upper switch, and wherein the control means are arranged to close the lower switch when the upper switch is open, for a recovery period at least equal to three times a product of a value of the capacitor by a value of the electrical resistance which is present between the capacitor and the control terminal.

2. A method of controlling the converter as claimed in claim 1, in which the control means are programmed to close the lower switch to impose a zero electric potential on the central terminal of the star when the upper switch is open, in order to force the charging of the charge pump capacitor.

3. A method of programming the control means for the converter as claimed in claim 1, the method comprising:

programming the control means to close the lower switch to impose a zero electric potential on the central terminal of the star when the upper switch is open, in order to force the charging of the charge pump capacitor.

* * * * *